(12) United States Patent
Park

(10) Patent No.: US 11,942,072 B2
(45) Date of Patent: Mar. 26, 2024

(54) WIRELESS COMMUNICATION DEVICE USING VOICE RECOGNITION AND VOICE SYNTHESIS

(71) Applicant: Sang Rae Park, Seoul (KR)

(72) Inventor: Sang Rae Park, Seoul (KR)

( * ) Notice: Subject to any disclaimer, the term of this patent is extended or adjusted under 35 U.S.C. 154(b) by 304 days.

(21) Appl. No.: 17/439,197

(22) PCT Filed: Feb. 3, 2021

(86) PCT No.: PCT/KR2021/001397
§ 371 (c)(1),
(2) Date: Sep. 14, 2021

(87) PCT Pub. No.: WO2022/158633
PCT Pub. Date: Jul. 28, 2022

(65) Prior Publication Data
US 2023/0090052 A1 Mar. 23, 2023

(30) Foreign Application Priority Data
Jan. 25, 2021 (KR) .......................... 10-2021-0010472

(51) Int. Cl.
*G10L 13/10* (2013.01)
*G10L 13/033* (2013.01)
(Continued)

(52) U.S. Cl.
CPC ............ *G10L 13/10* (2013.01); *G10L 13/033* (2013.01); *G10L 13/06* (2013.01); *G10L 15/22* (2013.01); *G10L 15/26* (2013.01); *G10L 19/0018* (2013.01)

(58) Field of Classification Search
CPC ....... G10L 13/10; G10L 13/02; G10L 13/033; G10L 13/06; G10L 15/22; G10L 15/26;
(Continued)

(56) References Cited

U.S. PATENT DOCUMENTS 6,161,091 A * 12/2000 Akamine ............ G10L 19/0018
704/256.1
2017/0256268 A1 * 9/2017 Sinder ................... G10L 21/003

FOREIGN PATENT DOCUMENTS

JP        1998-260692 A     9/1998
KR   10-1999-0031912 A     5/1999
(Continued)

OTHER PUBLICATIONS

Korean Office Action dated May 27, 2022, in counterpart Korean Patent Application No. 10-2021-0010472 (5 pages in Korean).

*Primary Examiner* — Yogeshkumar Patel
(74) *Attorney, Agent, or Firm* — NSIP Law

(57) ABSTRACT

Disclosed is a wireless communication device including a voice recognition portion configured to convert a voice signal input through a microphone into a syllable information stream using voice recognition, an encoding portion configured to encode the syllable information stream to generate digital transmission data, a transmission portion configured to modulate from the digital transmission data to a transmission signal and transmit the transmission signal through an antenna, a reception portion configured to demodulate from a reception signal received through the antenna to a digital reception data and output the digital reception data, a decoding portion configured to decode the digital reception data to generate the syllable information stream and a voice synthesis portion configured to convert the syllable information stream into the voice signal using voice synthesis and output the voice signal through a speaker.

8 Claims, 7 Drawing Sheets

(51) Int. Cl.
  *G10L 13/06*  (2013.01)
  *G10L 15/22*  (2006.01)
  *G10L 15/26*  (2006.01)
  *G10L 19/00*  (2013.01)

(58) Field of Classification Search
  CPC ... G10L 19/00; G10L 19/16718; G10L 13/00;
    G10L 15/02; G10L 19/0018; G10L 17/06;
    G10L 2015/027; H04B 1/38; H04B
    2001/3872; G01C 19/00; H01Q 3/08
  See application file for complete search history.

(56) References Cited

FOREIGN PATENT DOCUMENTS

| KR | 10-2006-0124063 A |   | 12/2006 |
|----|-------------------|---|---------|
| KR | 10-1102520 B1     |   | 1/2012  |
| KR | 101102520 B1      | * | 1/2012  |
| KR | 10-2018-0049422 A |   | 5/2018  |
| KR | 20180049422 A     | * | 5/2018  |
| KR | 10-2019-0024148 A |   | 3/2019  |
| KR | 20190024148 A     | * | 3/2019  |

* cited by examiner

Fig. 2

| SYLLABLE x CADENCE (3,120 x 5) | TIMBRE (400) | PRELIMINARY CODES (49,534) |
|---|---|---|

1 (0001H)      15,601 (3CF1H)      16,001 (3E81H)      65,535 (FFFFH)

WIRELESS COMMUNICATION DEVICE USING VOICE RECOGNITION AND VOICE SYNTHESIS

CROSS REFERENCE TO RELATED APPLICATIONS

This application is the U.S. National Stage Application of International Application No. PCT/KR2021/001397, filed on Feb. 3, 2021, which claims the benefit under 35 U.S.C. § 119(a) and § 365(b) of Korean Patent Application No. 10-2021-0010472, filed on Jan. 25, 2021, in the Korean Intellectual Property Office, the entire disclosure of which is incorporated herein by reference for all purposes.

TECHNICAL FIELD

The present invention relates to a wireless communication device, and more particularly, to a wireless communication device using voice recognition and voice synthesis.

BACKGROUND ART

A wireless communication device using voice communication generally converts a voice signal which is an analog signal into a digital signal through sampling, quantization, and encoding processes, transmits the digital signal through a wireless communication network, converts a received digital signal into a voice signal through an inversion process thereof, and outputs the voice signal. Since this voice communication method requires a bit rate of 128 kbps, 192 kbps, or 320 kbps in transmission of high-quality audio for music and requires a bit rate 2.4 kbps, 3.2 kbps, or the like in transmission of audio in which maximal voice compression is performed in voice communication, there is a limitation in lowering of bit rates.

DISCLOSURE

Technical Problem

The present invention is directed to providing a wireless communication device capable of innovatively lowering a bit rate in comparison to existing voice communication methods.

Technical Solution

One aspect of the present invention provides a wireless communication device including a voice recognition portion configured to convert a voice signal input through a microphone into a syllable information stream using voice recognition, an encoding portion configured to encode the syllable information stream to generate digital transmission data, a transmission portion configured to modulate from the digital transmission data to a transmission signal and transmit the transmission signal through an antenna, a reception portion configured to demodulate from a reception signal received through the antenna to a digital reception data and output the digital reception data, a decoding portion configured to decode the digital reception data to generate the syllable information stream and a voice synthesis portion configured to convert the syllable information stream into the voice signal using voice synthesis and output the voice signal through a speaker.

The syllable information may include a combination of an initial consonant, a medial consonant, and a final consonant.

The syllable information may further include cadence information.

The cadence information may include a normal sound, an ascending sound, a descending sound, a prolonged sound, and a stressed sound.

The syllable information may further include timbre information.

The timbre information may include a certain number of levels for each of men, women, old people, and children.

The initial consonant, the medial consonant, and the final consonant which are included in the syllable information may correspond to three axes of a three-dimensional coordinate system, and the syllable information may be mapped with digital data according to respective coordinate values of the initial consonant, the medial consonant, and the final consonant in the three-dimensional coordinate system.

The syllable information may further include cadence information, and the syllable information may be mapped with the digital data according to the respective coordinate values of the initial consonant, the medial consonant, and the final consonant in the three-dimensional coordinate system and the cadence information.

The wireless communication device may be a wireless communication device configured to perform voice communication through an artificial satellite, and the transmission portion and the reception portion may modulate and demodulate the transmission signal and the reception signal to perform transmission and reception with the artificial satellite, respectively.

The wireless communication device may further include a gyro sensor, a triaxial gear connected to the antenna, and an antenna posture control portion configured to control the triaxial gear to allow the antenna to be directed upward according to a sensing value of the gyro sensor.

The wireless communication device may further include a recording portion configured to store the digital transmission data output from the encoding portion and the digital reception data output from the reception portion.

Advantageous Effects

According to the present invention, a wireless communication device capable of innovatively lowering a bit rate using voice recognition and voice synthesis in comparison to existing voice communication methods may be provided.

Also, the present invention may be applied to all languages including English, Latin, and the like in which a syllable formation includes a medial consonant only, an initial consonant and a medial consonant, a medial consonant and a final consonant, an initial consonant, a medial consonant, and a final consonant.

Also, the present invention may minimize a memory necessary for recording, in comparison to existing voice communication methods and voice compression file storage methods, by digitalizing syllable information streams as data using a three-dimensional coordinate system, converting the data into digital transmission data, and then storing the digital transmission data in a recording portion (not shown) and also minimize the memory required for recording, in comparison to existing voice communication methods and voice compression file storage methods, by storing digital reception data output from a reception portion in the recording portion equally.

In addition, in the wireless communication device of the present invention, when the content of recording is retrieved from the recording portion, it is possible to retrieve continuous syllables while directly matching the syllables with digital data in the recording portion. Accordingly, in comparison to existing methods of storing a voice compression file and retrieving recording data, there is an advantage of quickly retrieving the content of recording such as a particular word and the like.

An existing speech-to-text (STT) type voice recognition method in which voice input through a microphone is converted into a sentence has a lot of errors such as converting input voice into a sentence having an entirely different meaning and has a limitation in accurately converting input voice into a desired sentence. Accordingly, in order to overcome such limitations, a large amount of voice recognition database (DB) and a high-level learning program configured to process voice recognition data are necessary.

On the other hand, an existing text-to-speech (TTS) type voice synthesis method in which an input sentence is converted into voice has difficulties such as contrivances or awkwardness in listening yet in reality. In order to overcome such limitations, a huge system and program are necessary.

In the present invention, since voice of an utterer which is input through a microphone is formed as a syllable information stream including syllables and cadences in a voice recognition portion and digital transmission data which is a numerical code is directly generated in an encoding portion, accurate voice may be transmitted. Digital reception data output from a reception portion may be formed as an accurate corresponding syllable information stream in a decoding portion so as to allow voice to be played through a voice synthesis portion and a speaker. Accordingly, the present invention has an advantage of including a system and a program which are innovatively simple in comparison to STT type voice recognition and TTS type voice synthesis.

DESCRIPTION OF DRAWINGS

FIG. 2 illustrates code components of syllable information.

MODES OF THE INVENTION

Figure 1:
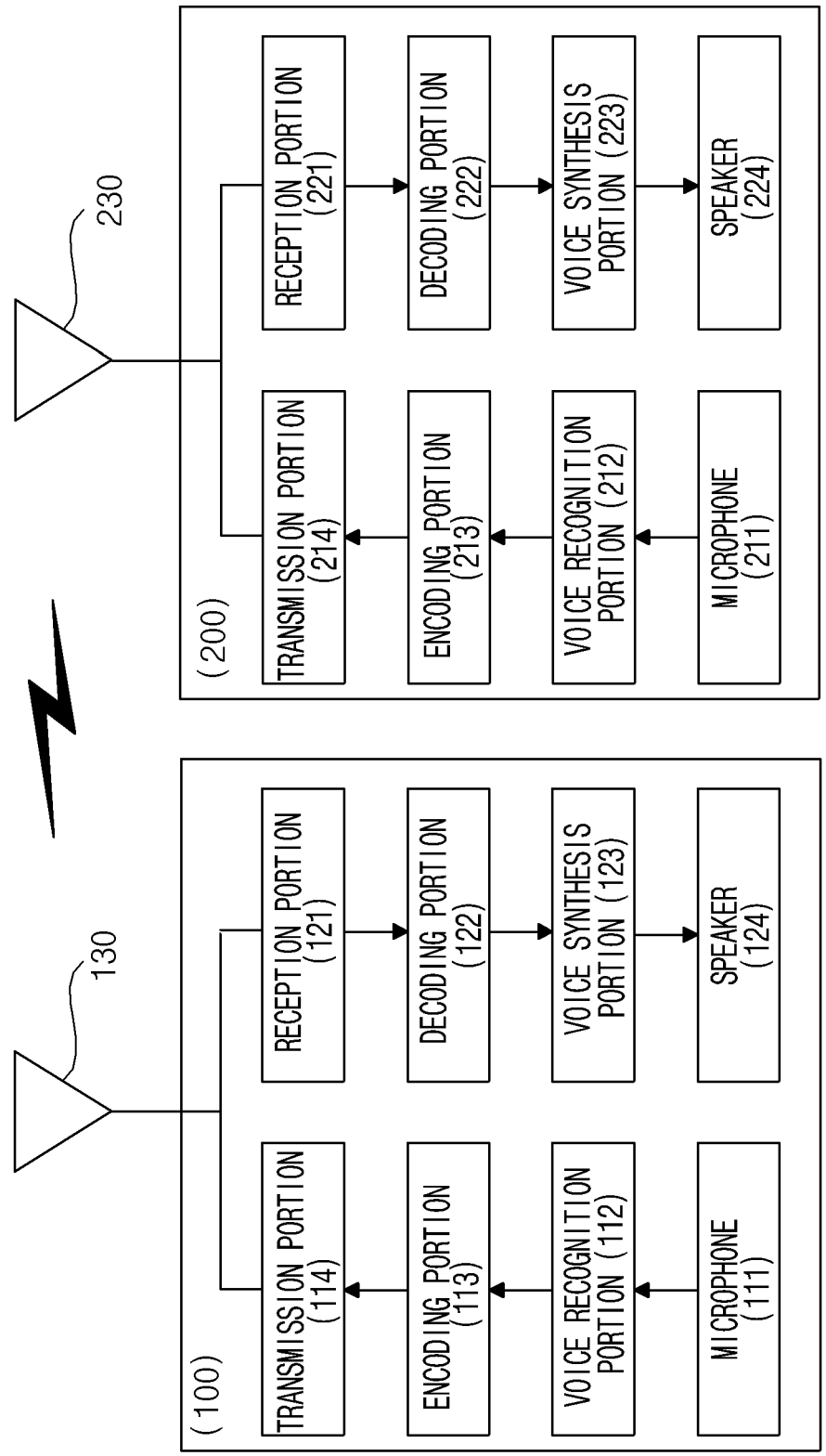
FIG. 1 illustrates components of a wireless communication device according to one embodiment of the present invention.

Hereinafter, exemplary embodiments of the present invention will be described in detail with reference to the drawings. Hereinafter, throughout the following description and the attached drawings, substantially like elements will be referred to as like reference numerals and a repetitive description thereof will be omitted. Also, in a description of the embodiments of the present invention, a detailed description of well-known functions or components of the related art will be omitted when it is deemed to obscure understanding of the embodiments of the present invention.

FIG. 1 illustrates components of a wireless communication device according to one embodiment of the present invention.

A wireless communication device 100 according to the embodiment includes a microphone 111, a voice recognition portion 112, an encoding portion 113, a transmission portion 114, a reception portion 121, a decoding portion 122, a voice synthesis portion 123, a speaker 124, and an antenna 130.

The wireless communication device 100 may perform voice communication with another wireless communication device 200. The wireless communication device 200 also includes, like the wireless communication device 100, a microphone 211, a voice recognition portion 212, an encoding portion 213, a transmission portion 214, a reception portion 221, a decoding portion 222, a voice synthesis portion 223, a speaker 224, and an antenna 230.

The wireless communication device 100 and the wireless communication device 200 may be devices configured to direct communicate with each other (for example, similar to radio sets), devices configured to communicate with each other through a base station (for example, similar to cellular phones), or devices configured to communicate with each other through an artificial satellite.

The voice recognition portion 112 or 212 converts a voice signal input through the microphone 111 or 211 into a syllable information stream through voice recognition. The encoding portion 113 or 213 encodes the syllable information stream and generates digital transmission data. The transmission portion 114 or 214 modulates the digital transmission data and transmits a transmission signal through the antenna 130 or 230.

The reception portion 121 or 221 demodulates a reception signal received through the antenna 130 or 230 and outputs digital reception data. The decoding portion 122 or 222 decodes the digital reception data and converts the decoded digital reception data into a syllable information stream. The voice synthesis portion 123 or 223 converts the syllable information stream into a voice signal through voice synthesis and outputs the voice signal through the speaker 124 or 224.

When the wireless communication device 100 and the wireless communication device 200 are devices configured to communicate with each other through an artificial satellite, the transmission portion 114 or 214 and the reception portion 121 or 221 modulate and demodulate the transmission signal and the reception signal to perform transmission and reception with the artificial satellite, respectively.

In the embodiment of the present invention, the syllable information may include a combination of an initial consonant, a medial consonant, and a final consonant, and the initial consonant, the medial consonant, and the final consonant may be written in Roman phonetic alphabets.

For example, there may be twenty-six initial consonants including a null phonetic value, a voiced consonant, a voiceless consonant, and a semiconsonant as follows.

Initial consonants: null (x), [b], [d], [h], [g], [l], [m], [n], [r], [v], [z], [ʒ], [dʒ], [dz], [d], [f], [k], [p], [s], [t], [ʃ], [tʃ], [ts], [θ], [j], and [w]

For example, medial consonants may include ten vowels as follows.

Medial consonants: [a], [e], [i], [o], [u], [ə], [ʌ], [ɔ], [ɛ], and [æ]

For example, there may be twelve final consonants including a null phonetic value, a voiced consonant, and a voiceless consonant as follows.

Final consonants: null (x), [b], [d], [g], [l], [m], [n], [r], [ŋ], [k], [p], and [t]

Also, the syllable information may include a comma referring to a pause section having a certain length.

However, according to a syllable to be articulated, when necessary, other syllable components in addition to the above syllable components may be added in the initial consonants, medial consonants, and final consonants.

The syllable information may further include prosodic information. The prosodic information may include totally five cadences of a normal sound, an ascending sound (↗), a descending sound (↘), a prolonged sound (:), and a stressed syllable (').

Also, the syllable information may further include timbre information. For example, the timbre information may be set to have a certain number (for example, 100 levels) for each of men, women, old people, and children and express totally four hundreds of timbres. As the timbre information, a particular timbre may be a default, a particular timbre may be set by analyzing a frequency or waveform of a user's voice, or a particular timbre selected by a user may be set. The timbre information may be changeable by the user in conversation. Types and levels of timbre may be extended or added. The voice synthesis portion 223 on a reception side may generate a voice signal by reflecting timbre information included in syllable information in voice synthesis.

The number of codes for expressing one syllable will be described as follows. First, since a combination of twenty-six initial consonants, ten medial consonants, and twelve final consonants becomes 3,120 (26×10×12=3,120) and there are five cadences for each combination, it becomes 3,120×5=15,600 and a comma is added thereto so as to become 15,601. Also, when four hundreds of timbre information are added, it becomes 15,601+400=16,001. That is, one valuable syllable may be expressed with 16,001 codes.

For example, when one syllable is expressed with 2 bytes, 2 bytes are 16 bits. Accordingly, it may be expressed as 0000 to FFFF, that is, 2 16=65,536. Also, since 0000 is used as a comma, 0001 to FFFF, that is, 65,535-16,001=49,534 are left and thus this part is utilizable as preliminary codes configured to transmit other additional information. That is, a comma may be expressed with 0000H, a syllable and a cadence may be expressed with 0001H (1) to 3CF1H (15,601), timbre may be expressed with ~3E81H (16,001), and ~FFFFH (65,535) may be used as preliminary codes. FIG. 2 illustrates code components of syllable information according thereto.

Figure 3:
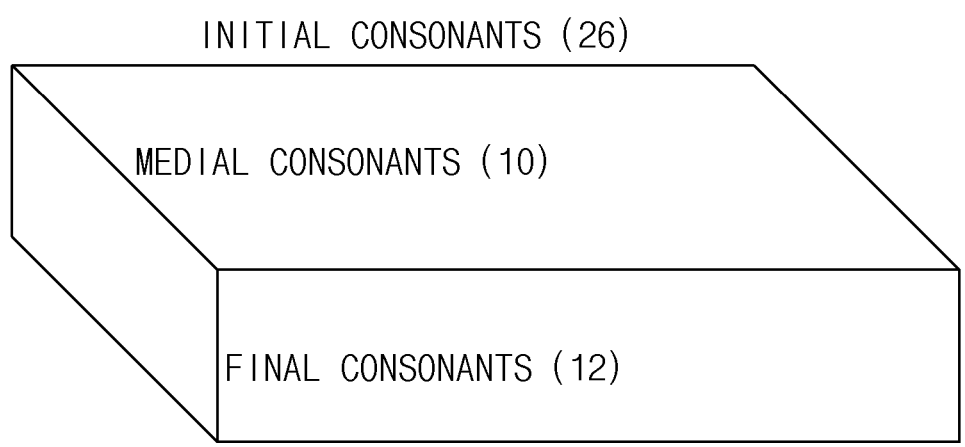
FIG. 3 illustrates a concept in which an initial consonant, a medial consonant, and a final consonant correspond to three axes of a three-dimensional coordinate system, respectively.

In the embodiment of the present invention, an initial consonant, a medial consonant, and a final consonant which are included in a syllable may correspond to three axes of a three-dimensional coordinate system as shown in FIG. 3. For example, the initial consonant may correspond to an X-axis, the medial consonant may correspond to a Y-axis, and the final consonant may correspond to a Z-axis. Also, according to coordinate values of the initial consonant, the medial consonant, and the final consonant in the three-dimensional coordinate system, the corresponding syllable may be mapped with digital data. Here, syllable information including a cadence may be mapped with the digital data according to cadence information in addition to the coordinate values of the initial consonant, the medial consonant, and the final consonant in the three-dimensional coordinate system.

Figure 4:
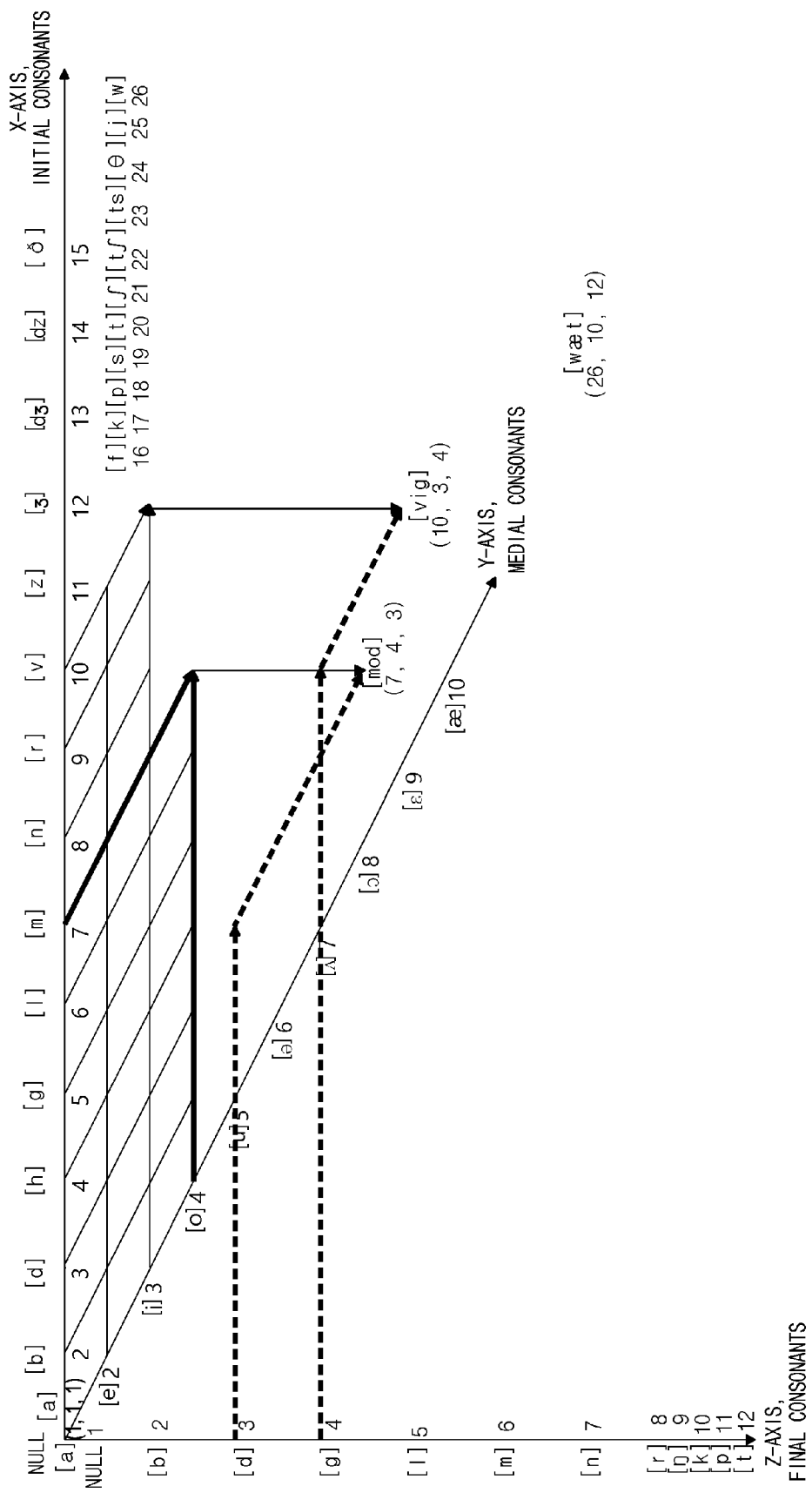
FIG. 4 illustrates a detailed example of a three-dimensional coordinate system corresponding to an initial consonant, a medial consonant, and a final consonant which are included in a syllable.

FIG. 4 illustrates a detailed example of a three-dimensional coordinate system corresponding to an initial consonant, a medial consonant, and a final consonant which are included in a syllable.

One syllable may be expressed with coordinates (x, y, z). For example, [a] is expressed with (1, 1, 1), [mod] is expressed with (7, 4, 3), [vig] is expressed with (10, 3, 4), [wøt] is expressed with (26, 10, 12). A comma is not shown and expressed with (0, 0, 0).

When a cadence value is referred to as n, for example, a normal sound may be expressed with n=1, an ascending sound may be expressed with n=2, a descending sound may be expressed with n=3, a prolonged sound may be expressed with n=4, and a stressed sound may be expressed with n=5.

Codes corresponding to the syllable (x, y, z) and the cadence n may be calculated according to the following equation.

$$f(x,y,z,n)=(Xm*Ym*Zm)*(n-1)\pm(Xm*Ym)*(z-1)+Xm*(y-1)+x$$

Here, Xm, Ym, and Zm are maximum values of x, y, and z, respectively, that is, Xm=26, Ym=10, Zm=12, and x, y, z≠0.

For example, when a normal sound [a] is expressed with a digital value, it becomes f(1, 1, 1, 1)=0001H.

For example, when an ascending sound [a] (↗) is expressed with a digital value, it becomes f(1, 1, 1, 2)=3121=0C31H.

For example, sentence [Are you my father?] is encoded as follows. Hereinafter, a comma will be expressed with '/'. Sentence [Are you my father?] is expressed with a syllable information stream as [[ar](:) [ju](:) (/) [ma] [i] (/) [fa](:) [d ə r](↗) (/)]. When this is expressed with (x, y, z, n), it becomes [(1, 1, 8, 4) (25, 5, 8, 4) (0, 0, 0) (7, 1, 1, 1) (1, 3, 1, 1) (0, 0, 0) (16, 1, 1, 4) (15, 6, 8, 2) (0, 0, 0)]. When this is expressed with codes according to the above equation, it becomes [(11,181=2BADH) (11,292=2C1CH) (0000H) (7=0007H) (21=0015H) (0000H) (9,361=24A0H) (5,085=13DDH) (0000H)].

An operation when user's voice [Are you my father?] is input through the microphone 111 of the wireless communication device 100 will be described with reference to FIG. 1 as follows. The voice recognition portion 112 converts voice [Are you my father?] into a syllable information stream [[ar](:) [ju](:) (/) [ma] [i] (/) [fa](:) [də r](↗) (/)]. The encoding portion 113 encodes the syllable information stream and generates digital transmission data [(11, 181=2BADH) (11,292=2C1CH) (0000H) (7=0007H) (21=0015H) (0000H) (9,361=24A0H) (5,085=13DDH) (0000H)]. The transmission portion 114 modulates the digital transmission data and transmits a transmission signal to the wireless communication device 200 through the antenna 130. The reception portion 221 of the wireless communication device 200 demodulates a reception signal and outputs digital reception data [(11,181=2BADH) (11,292=2C1CH) (0000H) (7=0007H) (21=0015H) (0000H) (9,361=24A0H) (5,085=13DDH) (0000H)]. The decoding portion 222 decodes and converts the digital reception data voice into syllable information stream [[ar](:) [ju](:) (/) [ma] [i] (/) [fa](:) [də r](↗) (/)]. The voice synthesis portion 223 converts the syllable information stream into voice signal [Are you my father?] and outputs the voice signal through the speaker 224.

Hereinafter, bit rate improvement shown in the embodiment of the present invention will be described. For example, when input voice is [Are you my father? Yes, I'm your father. Then, Are you my son? No.], about 10.5 seconds are necessary for utterance and a syllable stream is [[a:r] [ju:] (/) [ma] [i] (/) [fa:] [də r] (/) (/) (/) [je] [s] (/) (/) [a] [im] (/) [ju] [ə r] (/) [fa:] [də r] (/) (/) (/) [●en] (/) (/) [a:r] [Ju:] (/) [ma] [i] (/) [s ʌ n] (/) (/) (/) [no] [u] (/)] and includes forty two syllables (including a comma). Accordingly, since it is necessary to transmit about four syllables (42/10.5) per second, according to the embodiment of the present invention, a bit rate is 4×16 bit/s=64 bps.

64 bps is merely a value which is about one-five thousands of 320 kbps that is a high-quality audio transmission bit rate. Accordingly, the embodiment may secure a transmission channel about five thousand times more than an existing transmission method and have transmission efficiency about 37.5 times higher in comparison to 2.4 kbps that is a bit rate for voice communication in maximum compression.

Although an initial consonant, a medial consonant, and a final consonant which are included in a syllable are expressed with Roman phonetic alphabets in the embodiment of the present invention, the present invention is not limited to Roman phonetic alphabets and may be applied to any languages on the basis of any letters or characters capable of expressing an initial consonant, a medial consonant, and a final consonant such as of Korean phonetic alphabets, Japanese (hiragana) phonetic alphabets, the international phonetic alphabets, and the like.

Also, the wireless communication device 100 may further include a recording portion (not shown) configured to store the digital transmission data output from the encoding portion 113 or 213 and the digital reception data output from the reception portion 121 or 221.

Since the digital transmission data output from the encoding portion 113 or 213 or the digital reception data output from the reception portion 121 or 221 are formed by digitalizing the syllable information stream using the three-dimensional coordinate system as digital data, an available memory amount of a memory included in the recording portion may be minimized in comparison to an existing voice communication method or voice compression storage method.

Also, when a particular word or syllable is retrieved from the recording portion, the corresponding word or syllables may be retrieved while being directly matched with digital data. Accordingly, recording content of a particular word and the like may be quickly retrieved in comparison to an existing method of storing voice compression file and retrieving recording data.

Since a variety of methods of matching with digital data to retrieve a syllable or word may be provided and easily understood by those skilled in the art, a detailed description thereof will be omitted.

Figure 5:
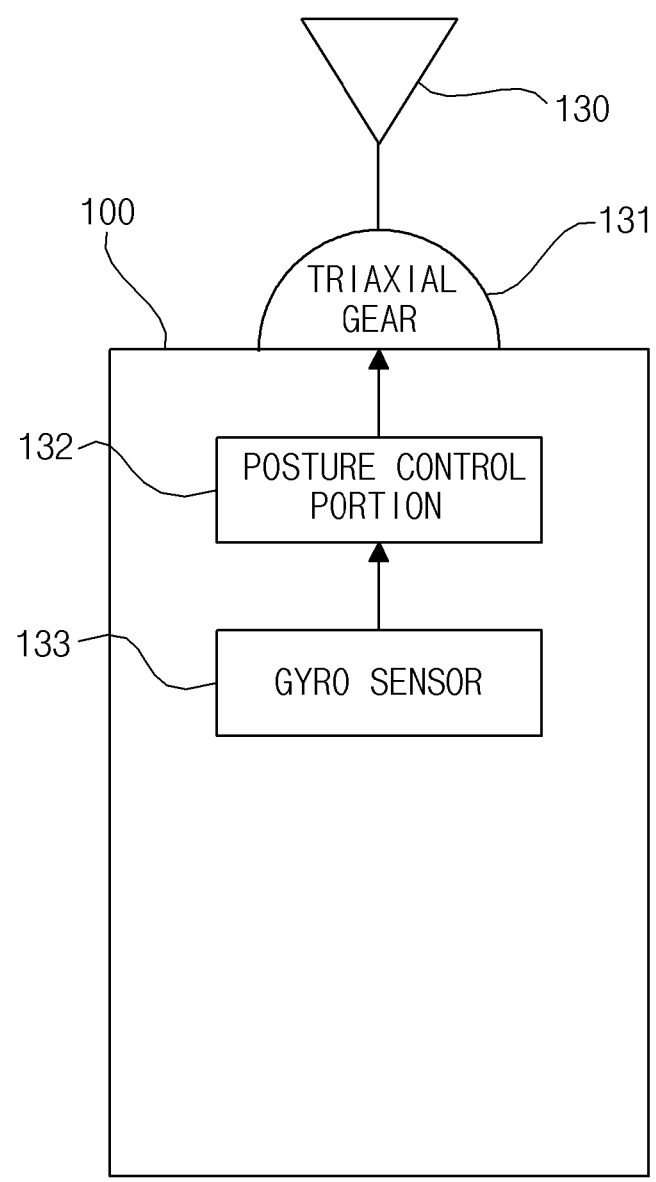
FIG. 5 illustrates additional components of the wireless communication device according to one embodiment of the present invention.

When the wireless communication device 100 is a wireless communication device configured to perform communication through an artificial satellite, the antenna 130 may be controlled to aim at the artificial satellite, that is, to be directed upward. FIG. 5 illustrates additional components of the wireless communication device according to one embodiment of the present invention.

Referring to FIG. 5, the wireless communication device 100 may further include a triaxial gear 131 connected to the antenna 130, a posture control portion 132, and a gyro sensor 133. The posture control portion 132 controls the triaxial gear 131 according to a sensing value of the gyro sensor 133 to allow the antenna 130 to be directed upward even when the wireless communication device 100 tilts.

Figure 6A:
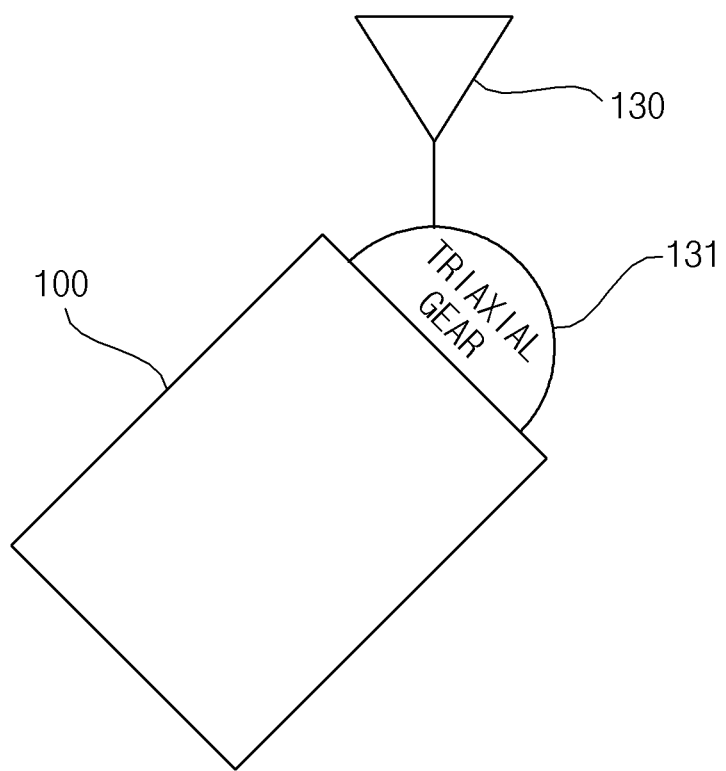
FIGS. 6A and 6B illustrate a state in which an antenna of the wireless communication device is controlled to be directed upward according to one embodiment of the present invention.
Figure 6B:
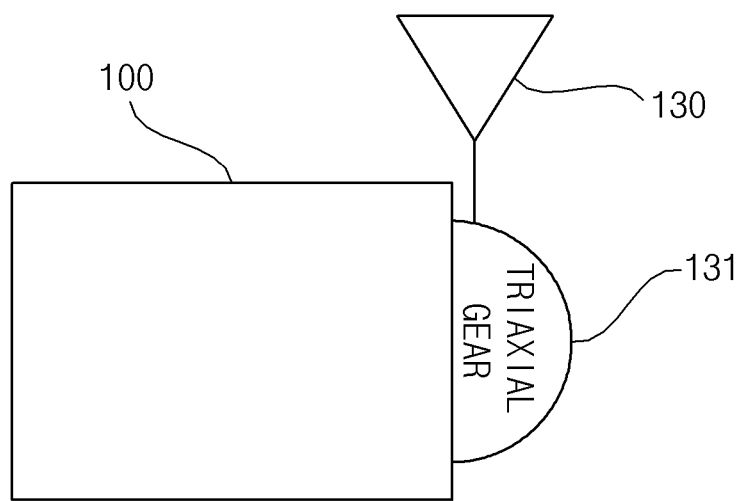

FIGS. 6A and 6B illustrate a state in which the antenna 130 of the wireless communication device 100 is controlled to be directed upward according to one embodiment of the present invention. As shown in the drawing, since the antenna 130 is directed upward even when the wireless communication device 100 tilts, communication with an artificial satellite is easily performed.

The embodiments of the present invention may be shown as functional block components and a variety of processing operations. Such functional blocks may be implemented using a variety of numbers of hardware and/or software components which implement particular functions. For example, an embodiment may employ integrated circuit components such as a memory, processing, logic, look-up table, and the like which are configured to perform a variety functions under the control of one or more microprocessors or other control devices. Like the components of the present invention being executable using software programming or software elements, the embodiment may include a data structure, processes, routines, or a variety of algorithms which are implemented through a combination of other programming components and may be implemented as programming and scripting languages such as C, C++, Java, an assembler, and the like. Functional aspects may be implemented as algorithms executed by one or more processors. Also, the embodiment may employ conventional arts for electronic environment settings, signal processing, data processing, and/or the like. The terms such as "mechanism," "element," "means," and "component" may be widely used and are not limited to mechanical and physical components. The terms may include the meaning of a series of routines of software in connection with a processor and the like.

The particular executions described in the embodiment are merely examples, and the scope of the embodiment is not limited to any methods. For a concise specification, a description of conventional electronic components, control systems, software, and other functional aspects of the systems will be omitted. Also, connection of lines or connection members between components shown in the drawings are exemplarily shown as functional connection and/or physical or circuit connections and may be a variety of replaceable or additional functional connections, physical connection, or circuit connections in a real apparatus. Also, unless stated in detail such as "essential," "significant," and the like, a component may not be essential for application of the present invention.

The exemplary embodiments of the present invention have been described above. It should be understood by one of ordinary skill in the art that a modification of the present invention may be implemented without departing from the essential features of the present invention. Therefore, the disclosed embodiments should be considered not in a limitative view but a descriptive view. The scope of the present invention will be shown in the claims not in the above description, and all differences within an equivalent range thereof should be construed as being included in the present invention.

The invention claimed is:

1. A wireless communication device comprising:
   a voice recognition portion configured to convert a voice signal input through a microphone into a syllable information stream using voice recognition;
   an encoding portion configured to encode the syllable information stream to generate digital transmission data;
   a transmission portion configured to modulate from the digital transmission data to a transmission signal and transmit the transmission signal through an antenna;

a reception portion configured to demodulate from a reception signal received through the antenna to a digital reception data and output the digital reception data;

a decoding portion configured to decode the digital reception data to generate the syllable information stream; and a voice synthesis portion configured to convert the syllable information stream into the voice signal using voice synthesis and output the voice signal through a speaker, wherein the syllable information comprises a combination of an initial consonant, a medial consonant, and a final consonant, wherein the syllable information further comprises cadence information, and wherein the cadence information comprises a normal sound, an ascending sound, a descending sound, a prolonged sound, and a stressed sound.

2. The wireless communication device of claim 1, wherein the syllable information further comprises timbre information.

3. The wireless communication device of claim 2, wherein the timbre information comprises a certain number of levels for each of men, women, old people, and children.

4. The wireless communication device of claim 1,
wherein the initial consonant, the medial consonant, and the final consonant which are included in the syllable information correspond to three axes of a three-dimensional coordinate system, and the syllable information is mapped with digital data according to respective coordinate values of the initial consonant, the medial consonant, and the final consonant in the three-dimensional coordinate system.

5. A wireless communication device comprising:
a voice recognition portion configured to convert a voice signal input through a microphone into a syllable information stream using voice recognition;

an encoding portion configured to encode the syllable information stream to generate digital transmission data;

a transmission portion configured to modulate from the digital transmission data to a transmission signal and transmit the transmission signal through an antenna;

a reception portion configured to demodulate from a reception signal received through the antenna to a digital reception data and output the digital reception data;

a decoding portion configured to decode the digital reception data to generate the syllable information stream; and a voice synthesis portion configured to convert the syllable information stream into the voice signal using voice synthesis and output the voice signal through a speaker, wherein the syllable information comprises a combination of an initial consonant, a medial consonant, and a final consonant, wherein the initial consonant, the medial consonant, and the final consonant which are included in the syllable information correspond to three axes of a three-dimensional coordinate system, and the syllable information is mapped with digital data according to respective coordinate values of the initial consonant, the medial consonant, and the final consonant in the three-dimensional coordinate system, wherein the syllable information further comprises cadence information, and wherein the syllable information is mapped with the digital data according to the respective coordinate values of the initial consonant, the medial consonant, and the final consonant in the three-dimensional coordinate system and the cadence information.

6. A wireless communication device comprising:
a voice recognition portion configured to convert a voice signal input through a microphone into a syllable information stream using voice recognition;

an encoding portion configured to encode the syllable information stream to generate digital transmission data;

a transmission portion configured to modulate from the digital transmission data to a transmission signal and transmit the transmission signal through an antenna;

a reception portion configured to demodulate from a reception signal received through the antenna to a digital reception data and output the digital reception data;

a decoding portion configured to decode the digital reception data to generate the syllable information stream; and a voice synthesis portion configured to convert the syllable information stream into the voice signal using voice synthesis and output the voice signal through a speaker, wherein the wireless communication device is configured to perform voice communication through an artificial satellite, and wherein the transmission portion and the reception portion modulate and demodulate the transmission signal and the reception signal to perform transmission and reception with the artificial satellite, respectively.

7. The wireless communication device of claim 6, further comprising:
a gyro sensor;
a triaxial gear connected to the antenna; and
an antenna posture control portion configured to control the triaxial gear to allow the antenna to be directed upward according to a sensing value of the gyro sensor.

8. The wireless communication device of claim 1, further comprising a recording portion configured to store the digital transmission data output from the encoding portion and the digital reception data output from the reception portion.

* * * * *